Figure 1:
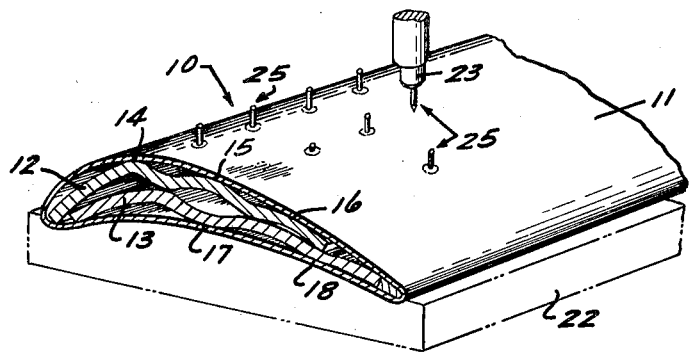

May 22, 1962 H. T. LIBBY 3,036,201

RESISTANCE PIN WELDING METHOD

Filed April 15, 1960

INVENTOR.
HENRY T. LIBBY
BY
ATTORNEY—

United States Patent Office 3,036,201
Patented May 22, 1962

3,036,201
RESISTANCE PIN WELDING METHOD
Henry Thomas Libby, Reading, Mass., assignor to General
Electric Company, a corporation of New York
Filed Apr. 15, 1960, Ser. No. 22,456
3 Claims. (Cl. 219—94)

This invention relates to welding, and more particularly to a welding method, and the joined parts produced thereby, in which, despite the welding operation, the surface of parts welded can be finished to present an unmarred surface. This invention is especially useful in joining members where at least one of them is of relatively slight thickness, and where there is a limited area of contact between members to be joined.

It has been found that in attempts to weld members, at least one of which is quite thin, of the order of magnitude of 0.010 inch, known methods are inadequate to achieve a satisfactory weld, while yet not adversely affecting the properties of the finished work. The problem stated is aggravated when the area of contact of parts to be joined is limited. Under these conditions, when tungsten inert arc welding is employed, excessive melting and distortion of the parts will result. With conventional resistance spot welding, while reasonably good welds can be produced, it is extremely difficult to maintain a given weld size. Moreover, in such spot welding, even using light head loads, it has been found that electrode indentation is markedly present in the finished work, and such indentation at the surface is often intolerable.

It is the primary object of the present invention to provide a welding method which permits the welding of a thin piece of metal to another, and yet permits a smooth, indentation free, surface on the finished work, and is particularly useful where the area of contact between the parts to be joined is limited.

The present novel method may conveniently be referred to as resistance pin welding. In carrying it out an expendable pin is used which is seated in the top electrode of the welding apparatus, and for this purpose a conventional resistance spot welding machine having a modified electrode may be employed. The pin is appropriately positioned in contact with the work surface, and a light head load applied. Current is then transmitted through the apparatus and the pin heats while the weld is made. Following welding, the pin may be clipped off, and the surface polished to yield a result with a surface virtually free from indentation and distortion.

It will be appreciated that the present method results in a localized weld, and it has been found that such welds produced thereby are consistent in size and strength. Not only is the present novel welding method superior to previously known methods in all of the respects heretofore enumerated, but additionally is superior to high temperature brazing because higher operating temperatures are permissible and base metal embrittlement by brazing alloys is avoided.

A consideration of the accompanying drawings will provide a fuller understanding of the present novel welding operation. For purpose of illustration, but not limitation, the drawings show the application of the present inventive welding method to the assembly of hollow turbine buckets.

Figure 2:
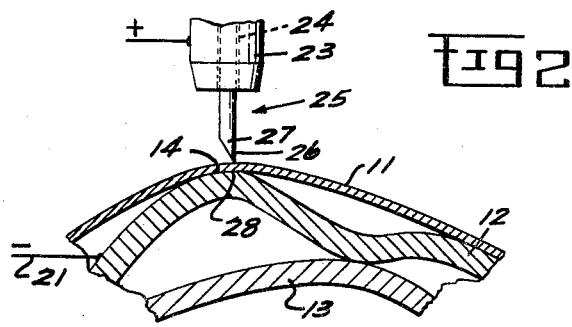
Figure 3:
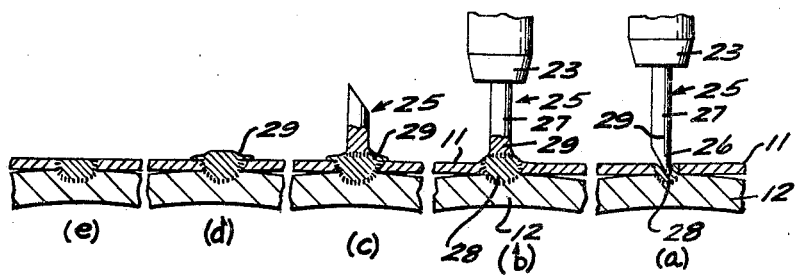

In the drawings:

FIG. 1 is a perspective drawing of elements assembled for welding into a hollow turbine bucket, a fixture upon which such assembly is mounted being shown in phantom, and the general appearance of the assembly in the course of welding being indicated;

FIG. 2 is an enlarged cross-section taken through an assembly to be welded into a hollow turbine bucket such as that of FIG. 1, and includes a portion of a suitable welding electrode, though the welding apparatus is not otherwise shown, being of known construction; and FIG. 3 shows in cross-section the sequential relationships upon welding as herein disclosed, the sequence beginning at (a), (e) showing the final welded structure.

The assembly 10 for welding into a hollow turbine bucket consists of a thin outer skin, 11, and within such skin are shown two corrugated struts 12 and 13 placed back to back. Because struts 12 and 13 are corrugated, they are in contact with the outer skin only at ridges 14, 15, 16, 17 and 18, rather than having surfaces mating over a considerable extent with the skin 11. By reason of this construction, a sheet metal turbine bucket which is susceptible to being air cooled will result.

Following assembly of skin 11 and struts 12 and 13 as shown in FIG. 1, the assembly 10 is ready for welding. Instead of using a conventional bottom electrode in the welding of such assembly, electrical connection 21 may be made to strut 12 preparatory to welding such strut 12 to the skin 11 at ridges 14, etc. As shown in FIG. 1, the assembly 10 is disposed in a contoured insulated fixture 22 to provide proper backing to the assembly during welding and to prevent shunting of the welding current through the skin material. For effective welding, the surfaces of all parts involved should be free from surface oxide and other foreign matter.

The top electrode 23 of the welding apparatus has a recess 24 within which a pin 25 may be disposed. A representation of the welding apparatus other than a portion of the top electrode is omitted, since it is of conventional construction. The pin 25 has a pointed leading end portion 26 and a shank portion 27 of undiminished diameter. It has been found that in production such pointed end may be easily produced by employing a wire cutter, so that rather than tapering conically to a point, such end 26 can well taper in the manner of a wedge rather than a cone, and it is this variety of pointed end portion illustrated in the drawings. As seen in FIG. 2 prior to the transmission of current for welding, top electrode 23 is brought into a position where pin 25 is in contact with skin 11 above the interface 28 at which ridge 14 contacts skin 11, the pin 25 being maintained in contact with the skin with a light pressure.

The sequence of events which occurs when current passes is illustrated in FIG. 3, the progression proceeding from (a) to (e) in such figure. The starting relationship between pin 25, electrode 23, and the work has already been described in connection with FIG. 2. Current is then passed through the welding apparatus, the circuit including electrode 23 and the pin disposed therein, and by reason of its attachment to electrical connection 21, strut 12. Initially, the tip of pointed end portion 26 of pin 25 offers maximum resistance to the current, and maximum heating first occurs at such tip, and thereby at the adjacent localized portions of skin 11 and strut 12. When the heat generated at this location reaches sufficient temperature, the metal of skin 11 there will become plastic, so that under the influence of the axial pressure exerted upon pin 25, penetration of the skin 11 commences at this vicinity, as illustrated at (a) in FIG. 3. Further, under the influence of such axial pressure, pointed leading end portion 26 becomes further heated and is then consumed progressively in forming the weld at interface 28, (a) of FIG. 3. It will be appreciated that such progressive weld formation proceeds because as successive increments of pointed leading end portion 26 of pin 25 are consumed, the next increment thereof will present a minimum cross-section and therefore maximum resistance to the flow of current. Each increment will for this reason reach sufficient temperature to render it plastic, at which time it will fuse into the body of the weld.

Such will be the progress of events until the whole of pointed leading end portion 26 is consumed in the weld. When this has occurred, heating sufficient for plasticity of the pin material will extend into the portion 29 of shank portion 27 of the pin, (b) in FIG. 3. As illustrated at (c) in FIG. 3, at this time the portion 29 of the pin will upset, since it is still under axial pressure. Upon upset the current is cut off and operation of the welding apparatus stopped, for the weld is then complete. Upon upset, the material of portion 29 fills any depression or indentation caused by the pin during welding. Moreover, at upset the part of shank portion 27 of pin 25 between electrode 23 and upset portion 29 has not yet reached sufficient temperature to become plastic and remains solid to maintain electrode 23 out of contact with the work despite the exertion of pressure by such electrode. Since this is the situation when upset first occurs, and since the current and operation of the welding apparatus is stopped immediately upon upset, indentation of the work surface by electrode 23 is prevented. Because of the stated effects, a pin made of the material of the skin should preferably be used.

After completion of welding, the pin is then cut off, (c) of FIG. 3, and electrode 23 withdrawn. This leaves a portion of the pin projecting outwardly. The appearance of a welded assembly where this condition prevails with a number of pins is illustrated in FIG. 1. In order to finish off the surface of skin 11 to present a uniform unmarred surface, the projecting portion of expendable pin 25 is clipped off close to the work, as seen at (d) in FIG. 3. Finally as at (e) in FIG. 3, the surface of skin 11 is polished. While the accomplishment of only a single weld is illustrated in FIG. 3, it will be understood that, as shown in FIG. 1, a number of like welds are necessary to secure the assembly into an integrated part. Such multiple welds can be automatically programmed in automatic welding apparatus by well known controls.

*Example*

In carrying out a specific welding procedure for a hollow sheet metal turbine bucket as heretofore generally described, the skin 11 was .010 inch thick, while struts 12 and 13 were .062 inch thick. Different materials were used for the skin, in one case an alloy comprising 80% Ni—15% Cr and 5% Al and in another case an alloy comprising 80% Ni—20% Cr. For the struts, an alloy nominally comprising in percent by weight about 0.15 C, 19 Cr, 10 Mo, 10 Co, 2.5 Ti, 1 Al, 0.006 B, balance Ni was used.

A 20 KVA conventional spot welding machine was modified so that its top electrode included a recess as shown in FIG. 2, to hold a pin (.032 inch in diameter x ¼ inch long), the pin protruding 1/32 inch beyond the end of the electrode. The pin material was A.I.S.I. type 347 stainless steel.

The wedge shaped end of the pin was formed simply by cutting with a pair of wire cutters, and the resulting edge in contact with the skin had the approximate dimension of .003 inch x .032 inch. Surface oxide and other foreign matter were removed from all parts involved in the welding operation by vapor blasting and chemical cleaning.

The pin was maintained against the skin under a pressure of ten pounds, and the machine was operated to make the weld under the following conditions: welding secondary amperes, approximately 4000; heat cycles, 6; number of pulses, 1; squeeze time, 30 cycles; hold time, 40 cycles.

Peel tests of resulting welds revealed rows of nuggets approximately .050 inch in diameter. Tensile shear tests performed on single welds required a load of approximately 260 pounds to pull a button, i.e. cause shear failure, and this load at failure did not vary more than 5% from weld to weld, so that the shear strength of the welds was quite consistent.

From the foregoing general and specific descriptions it will be apparent that the present novel welding process can be readily adapted for modern automated mass production techniques. In such adaptation, in place of disposing individual pins within a recess in a welding electrode, a wire might be fed from a reel through the electrode. The invention as disclosed might by the same token be modified in other respects, while yet falling within the ambit of the present invention.

What is claimed is:

1. In a method of welding a first member to a second member, the steps of: contacting the members one with the other at a point to be welded, one of the members being electrically connected with a first electrode; contacting the first member with a tip portion of a wire, the wire being electrically connected with a second electrode and having a shank portion and a tip portion, the tip portion tapering substantially to a point and contacting the surface of the first member substantially opposite the point of contact between the members, the wire being biased toward the first member by a biasing force; passing an electric current between the electrodes for a time and of an intensity (1) to allow the biased tip portion to penetrate the first member and to contact the second member, then (2) to melt the wire tip portion to fuse the tip portion to the second member and then (3) to heat the wire shank portion adjacent the tip portion to a temperature at which the biasing force exceeds the elastic limit of the shank portion adjacent the tip portion at that temperature but does not exceed the elastic limit of the remainder of the shank portion at a lower temperature whereby the shank portion adjacent the tip portion upsets toward said member.

2. A method of welding a first member to a second member, the first member having a cross-sectional dimension less than the second member, comprising the steps of: contacting the members one with the other at a point to be welded, one of the members being electrically connected with a first electrode; contacting the first member with a tip portion of a wire, the wire being electrically connected with a second electrode and having a shank portion and a tip portion, the tip portion tapering substantially to a point and contacting the surface of the first member substantially opposite the point of contact between the members, the wire being biased toward the first member by a biasing force; passing an electric current between the electrodes for a time and of an intensity (1) to melt the first member at the area of contact with the wire tip portion to allow the biased tip portion to penetrate the first member and to contact the second member, then (2) to melt the wire tip portion to fuse the tip portion to the second member and then (3) to heat the wire shank portion adjacent the tip portion to a temperature at which the biasing force exceeds the elastic limit of the shank portion adjacent the tip portion at that temperature but does not exceed the elastic limit of the remainder of the shank portion at a lower temperature whereby the shank portion adjacent the tip portion upsets toward said member; and then withdrawing the biasing force upon upset of the wire.

3. A method of welding a first member to a second member, the first member having a cross-sectional dimension substantially less than the second member, comprising the steps of: contacting the members one with the other at a point to be welded, one of the members being electrically connected to a first electrode; contacting the first member with the tip portion of a wire, the wire being disposed for a portion thereof within a recess in an electrode of a welding apparatus and in electrical contact with the electrode, the wire having a shank portion and a tip portion, the tip portion tapering substantially to a point and contacting the surface of the first member opposite the point of contact between the members, the electrode and recessed wire being biased axially toward the first member by a biasing force; passing an electric current between the electrodes for a time and of an intensity (1) to melt the first member at the area of contact with the wire tip portion to allow the biased tip portion to penetrate the first member and to contact the second member, then (2) to melt the wire tip portion to fuse the tip portion to the second member and then (3) to heat the wire shank portion adacent the tip portion to a temperature at which the biasing force exceeds the elastic limit of the shank portion adjacent the tip portion at that temperature but does not exceed the elastic limit of the remainder of the shank porion at a lower temperature whereby the shank portion adjacent the tip portion upsets toward said member; and then withdrawing the biasing force upon upset of the wire.

References Cited in the file of this patent
UNITED STATES PATENTS

| | | |
|---|---|---|
| 1,294,680 | Lachman | Feb. 18, 1919 |
| 2,316,597 | Kershaw | Apr. 13, 1943 |
| 2,635,167 | Nelson | Apr. 14, 1953 |